(12) United States Patent
Fainstain

(10) Patent No.: US 10,152,772 B2
(45) Date of Patent: Dec. 11, 2018

(54) TECHNIQUES FOR SAMPLING SUB-PIXELS OF AN IMAGE

(71) Applicant: Advanced Micro Devices, Inc., Sunnyvale, CA (US)

(72) Inventor: Evgene Fainstain, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/408,117

(22) Filed: Jan. 17, 2017

(65) Prior Publication Data
US 2017/0206626 A1  Jul. 20, 2017

Related U.S. Application Data

(60) Provisional application No. 62/279,889, filed on Jan. 18, 2016.

(51) Int. Cl.
| | |
|---|---|
| *G06T 5/00* | (2006.01) |
| *G06T 15/00* | (2011.01) |
| *G06T 19/20* | (2011.01) |
| *G06T 1/20* | (2006.01) |
| *G06T 1/60* | (2006.01) |
| *G06T 15/50* | (2011.01) |

(52) U.S. Cl.
CPC ............. *G06T 5/002* (2013.01); *G06T 1/20* (2013.01); *G06T 1/60* (2013.01); *G06T 15/005* (2013.01); *G06T 15/503* (2013.01); *G06T 19/20* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 5,274,754 A | 12/1993 | Sfarti | |
| 5,818,456 A | 10/1998 | Cosman et al. | |
| 6,339,426 B1 | 1/2002 | Lui et al. | |

(Continued)

FOREIGN PATENT DOCUMENTS

JP  2004088251  3/2004

OTHER PUBLICATIONS

International Search Report and Written Opinion in International Application No. PCT/US17/13786, dated Apr. 4, 2017, 13 pages.

(Continued)

*Primary Examiner* — Martin Mushambo
(74) *Attorney, Agent, or Firm* — Meyertons Hood Kivlin Kowert and Goetzel PC; Rory D. Rankin

(57) ABSTRACT

Systems, apparatuses, and methods for generating and utilizing sub-pixel sampling patterns on a processor are disclosed. In one embodiment, a processor includes at least multiple execution units and a memory. The processor generates sub-pixel sampling coordinates within each pixel of an image being rendered based on a rotated grid superimposed on the image. The processor also specifies an amount of rotation for the rotated grid. The processor utilizes the sub-pixel sampling coordinates for determining which locations to sample within the image being rendered. The sampling patterns generated based on these techniques enable using more complex and computationally efficient anti-aliasing resolve filters, resulting in higher quality images.

20 Claims, 20 Drawing Sheets

(56) References Cited

U.S. PATENT DOCUMENTS

| | | |
|---|---|---|
| 6,525,723 B1 | 2/2003 | Deering |
| 7,456,846 B1 | 11/2008 | King et al. |
| 7,684,641 B1 | 3/2010 | Toksvig |
| 7,916,155 B1 | 3/2011 | Moreton |
| 8,269,788 B2 | 9/2012 | Tuomi |
| 8,345,063 B2 | 1/2013 | Iourcha et al. |
| 8,928,690 B2 | 1/2015 | Brennan |
| 9,019,299 B2 | 4/2015 | Iourcha et al. |
| 2001/0030655 A1 | 10/2001 | Anwar |
| 2002/0093520 A1 | 7/2002 | Larson |
| 2003/0043169 A1 | 3/2003 | Hunter |
| 2003/0095134 A1 | 5/2003 | Tuomi et al. |
| 2003/0206179 A1* | 11/2003 | Deering ............... G06T 3/0081 345/589 |
| 2003/0206663 A1 | 11/2003 | Daly |
| 2003/0210251 A1* | 11/2003 | Brown ................. G06T 11/203 345/611 |
| 2005/0062767 A1 | 3/2005 | Choe et al. |
| 2006/0061592 A1* | 3/2006 | Akenine-Moller ......................... G06T 15/005 345/611 |
| 2006/0087518 A1 | 4/2006 | Ameline et al. |
| 2007/0257935 A1 | 11/2007 | Koduri et al. |
| 2008/0012878 A1* | 1/2008 | Nystad ................. G06T 11/001 345/613 |
| 2009/0046108 A1 | 2/2009 | Brown Elliott et al. |
| 2009/0129664 A1 | 5/2009 | Tsuchiya et al. |
| 2009/0167778 A1 | 7/2009 | Wei |
| 2009/0195552 A1* | 8/2009 | Nystad ................... G06T 11/40 345/611 |
| 2009/0256848 A1 | 10/2009 | Iourcha et al. |
| 2010/0002000 A1 | 1/2010 | Everitt et al. |
| 2010/0246692 A1 | 9/2010 | Rusanovskyy et al. |
| 2011/0142366 A1 | 6/2011 | Young |
| 2011/0150331 A1 | 6/2011 | Young |
| 2011/0249011 A1 | 10/2011 | Lalonde et al. |
| 2011/0274175 A1 | 11/2011 | Sumitomo |
| 2012/0127331 A1 | 5/2012 | Grycewicz |
| 2013/0222442 A1 | 8/2013 | Gu et al. |
| 2013/0249927 A1 | 9/2013 | Brennan |
| 2014/0118352 A1 | 5/2014 | Hakura et al. |
| 2014/0176541 A1* | 6/2014 | Surti ..................... G06T 15/503 345/420 |
| 2014/0267232 A1 | 9/2014 | Lum et al. |
| 2014/0327696 A1* | 11/2014 | Pomianowski ........... G06T 1/60 345/611 |
| 2015/0070381 A1 | 3/2015 | Lum et al. |
| 2015/0193968 A1 | 7/2015 | Barringer et al. |
| 2015/0311265 A1 | 10/2015 | Matsueda et al. |
| 2016/0035129 A1 | 2/2016 | Bolz et al. |
| 2016/0057420 A1 | 2/2016 | Pang et al. |
| 2016/0203578 A1* | 7/2016 | Shoshan ............... G06T 3/4007 345/428 |
| 2016/0212332 A1 | 7/2016 | Tang et al. |
| 2016/0366386 A1 | 12/2016 | Douady-Pleven et al. |
| 2016/0379403 A1 | 12/2016 | Seiler |
| 2017/0132833 A1* | 5/2017 | Sathe ......................... G06T 1/20 |
| 2017/0206638 A1 | 7/2017 | Fainstain |

OTHER PUBLICATIONS

Final Office Action in U.S. Appl. No. 15/408,054, dated Mar. 21, 2018, 15 pages.

Non-Final Office Action in U.S. Appl. No. 15/408,054, dated Oct. 10, 2017, 11 pages.

Non-Final Office Action in U.S. Appl. No. 15/408,054, dated Jul. 26, 2018, 14 pages.

* cited by examiner

Slope 4x1
17 Samples Per Pixel

TECHNIQUES FOR SAMPLING SUB-PIXELS OF AN IMAGE

PRIORITY INFORMATION

This application claims benefit of priority of U.S. Provisional Application Ser. No. 62/279,889 titled "Advanced Multisampling Techniques For Realtime 3D Graphics" filed Jan. 18, 2016, whose inventor was Evgene Fainstain, which is hereby incorporated by reference in its entirety as though fully and completely set forth herein.

BACKGROUND

Description of the Related Art

Three-dimensional (3D) rendering is a computationally-intensive process, and to produce realistic (i.e., cinematic) high quality real-time rendering, a significant amount of computing power is required. The 3D hardware manufacturers continually create more powerful devices (e.g., graphical processing units (GPUs)) to perform rendering tasks. A GPU is a complex integrated circuit that is configured to perform graphics-processing tasks. For example, a GPU can execute graphics-processing tasks required by an end-user application, such as a video-game application. The GPU can be a discrete device or can be included in the same device as another processor, such as a central processing unit (CPU).

Unfortunately, modern real-time 3D rendering hardware is not powerful enough to properly simulate the physical world in real-time. For example, ray tracing-like algorithms are too computationally expensive to implement in real-time. Accordingly, various efficiency improvement techniques are used to produce an image that seems real enough although the image is not entirely physically accurate. A common problem of 3D generated images is the inherent "zipper" effect (i.e., "jaggies" or "aliasing"). Up until now, the techniques which have been developed to minimize these aliasing effects on rendered images have been ineffective and/or too computationally expensive.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
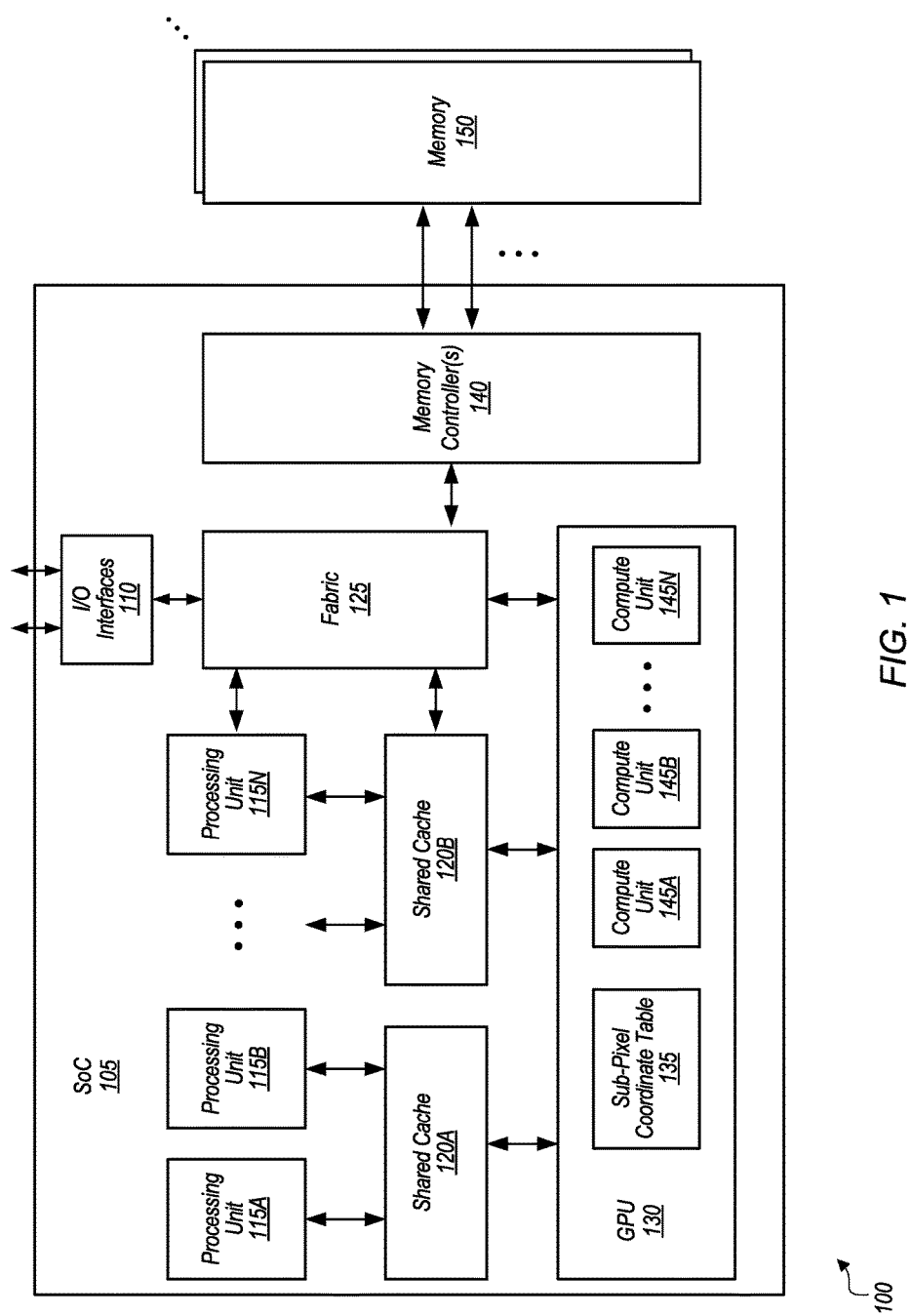
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for generating sub-pixel sampling patterns are disclosed. In one embodiment, a processor includes at least a memory and multiple execution units. In one embodiment, the processor is a GPU. In other embodiments, the processor is any of various other types of processors (e.g., digital signal processor (DSP), field programmable gate array (FPGA), application specific integrated circuit (ASIC), multi-core processor). In one embodiment, the processor is configured to generate, based on a rotated grid, a plurality of sub-pixel sampling coordinates for sampling sub-pixel locations within each pixel of an image. The processor is configured to store the plurality of sub-pixel sampling coordinates in the memory. Then, the processor utilizes the plurality of sub-pixel sampling coordinates to sample sub-pixel locations within each pixel of the image being rendered by the plurality of execution units.

In one embodiment, generating the plurality of sub-pixel sampling coordinates involves generating a first set of parallel lines through given locations of a square grid of pixels of the image and generating a second set of parallel lines perpendicular to the first set of parallel lines. The first set of parallel lines and second set of parallel lines form a rotated grid for the image. In one embodiment, the given locations are corners of the pixels. In another embodiment, the given locations are centers of the pixels. Next, the rotated grid is shifted to cause the vertices of the first set and second set of parallel lines to have a center of gravity which is in a center of each pixel. Then, the locations of the vertices of the first set and second set of parallel lines are utilized as the plurality of sub-pixel sampling coordinates within each pixel of the image.

By utilizing the above approach to generate sub-pixel sampling coordinates, the sub-pixel sampling coordinates will be regularly spaced both horizontally and vertically throughout the image. Additionally, there will be only one sub-pixel sampling location per pixel on a given horizontal or vertical line which traverses the image. In one embodiment, when generating the first set of parallel lines, a slope of each line of the first set of parallel lines is equal to a ratio of two mutually prime numbers. For example, in one embodiment, a slope of each line of the first set of parallel lines is two pixels divided by one pixel, resulting in five sub-pixel sampling locations per pixel. In other embodiments, other slopes of each line of the first set of parallel lines can be utilized, resulting in other numbers of sub-pixel sampling locations per pixel.

Referring now to FIG. 1, a block diagram of one embodiment of a computing system 100 is shown. In one embodiment, computing system 100 includes system on chip (SoC) 105 coupled to memory 150. SoC 105 can also be referred to as an integrated circuit (IC). In one embodiment, SoC 105 includes processing units 115A-N, input/output (I/O) interfaces 110, shared caches 120A-B, fabric 125, graphics processing unit (GPU) 130, and memory controller(s) 140. SoC 105 can also include other components not shown in FIG. 1 to avoid obscuring the figure. Processing units 115A-N are representative of any number and type of processing units. In one embodiment, processing units 115A-N are central processing unit (CPU) cores. In another embodiment, one or more of processing units 115A-N are other types of processing units (e.g., specific integrated circuit (ASIC), field programmable gate array (FPGA), digital signal processor (DSP)). Processing units 115A-N are coupled to shared caches 120A-B and fabric 125.

In one embodiment, processing units 115A-N are configured to execute instructions of a particular instruction set architecture (ISA). Each processing unit 115A-N includes one or more execution units, cache memories, schedulers, branch prediction circuits, and so forth. In one embodiment, the processing units 115A-N are configured to execute the main control software of system 100, such as an operating system. Generally, software executed by processing units 115A-N during use can control the other components of system 100 to realize the desired functionality of system 100. Processing units 115A-N can also execute other software, such as application programs.

GPU 130 includes at least sub-pixel coordinate table 135 and compute units 145A-N which are representative of any number and type of compute units that are used for graphics or general-purpose processing. Sub-pixel coordinate table 135 is a programmable table which stores the coordinates of sub-pixel sampling locations within the pixels of an image being rendered by GPU 130. It is noted that the term "sub-pixel sampling locations" is defined as the multiple locations for sampling the value of a parameter (e.g., color, depth, stencil, transparency) within a given pixel of an image being rendered. The term "sub-pixel sampling locations" indicates that there will be multiple sampling locations within each pixel of the image being rendered. Any of various different types of sub-pixel sampling patterns can be utilized in different embodiments. The sub-pixel sampling pattern is generated and programmed into sub-pixel coordinate table 135 to specify which locations within the pixels should be sampled when processing a given image.

Compute units 145A-N can also be referred to as "shader arrays", "shader engines", "shader units", "single instruction multiple data (SIMD) units", or "SIMD cores". Each compute unit 145A-N includes a plurality of execution units. GPU 130 is coupled to shared caches 120A-B and fabric 125. In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

In one embodiment, GPU 130 is configured to detect a request to perform an anti-aliasing resolve operation on a first image. In one embodiment, the term "resolve operation" is defined as converting a sub-pixel sampled surface into a surface with one sample per pixel. Responsive to detecting the request, GPU 130 expands dimensions of the first image to create a second image, filters the second image with a post-processing anti-aliasing filter to create a third image, and then performs averaging of the third image to create a fourth image, wherein the fourth image is a result of the anti-aliasing resolve operation. Expanding dimensions of the first image involves converting sub-pixels of the first image into regular pixels of the second image. GPU 130 can also rotate the first image to align the sub-pixels into a vertical and horizontal grid pattern within the second image.

I/O interfaces 110 are coupled to fabric 125, and I/O interfaces 110 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 110. Such peripheral devices include (but are not limited to) displays, keyboards, mice, printers, scanners, joysticks or other types of game controllers, media recording devices, external storage devices, network interface cards, and so forth.

SoC 105 is coupled to memory 150, which includes one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth. Although not explicitly shown in FIG. 1, SoC 105 can also include one or more cache memories that are internal to the processing units 115A-N and/or compute units 145A-N. In some embodiments, SoC 105 includes shared caches 120A-B that are utilized by processing units 115A-N and compute units 145A-N. In one embodiment, caches 120A-B are part of a cache subsystem including a cache controller.

It is noted that the letter "N" when displayed herein next to various structures is meant to generically indicate any number of elements for that structure (e.g., any number of processing units 115A-N) including one. Additionally, different references within FIG. 1 that use the letter "N" (e.g., processing units 115A-N and compute units 145A-N) are not intended to indicate that equal numbers of the different elements are provided (e.g., the number of processing units 115A-N can differ from the number of compute units 145A-N).

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. Additionally, in other embodiments, computing system 100 and SoC 105 can be structured in other ways than shown in FIG. 1.

Figure 2:
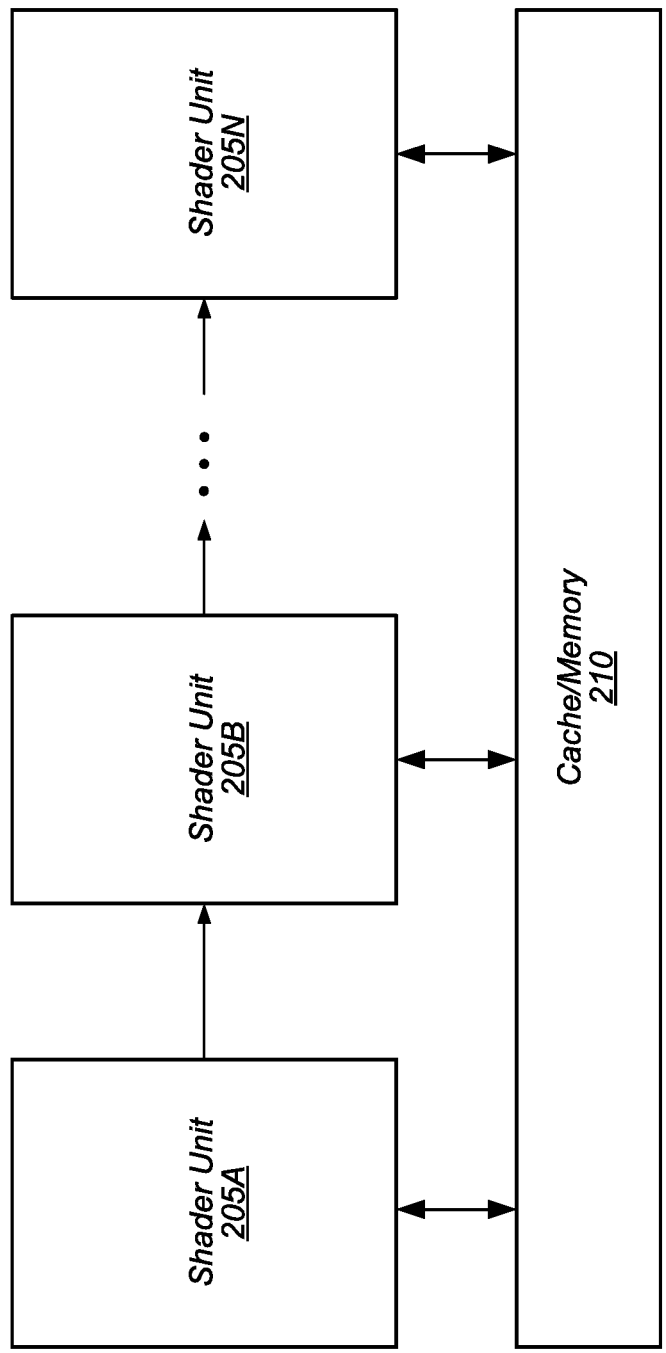
FIG. 2 is a block diagram of one embodiment of a graphics processing pipeline.

Turning now to FIG. 2, a block diagram of one embodiment of a graphics processing pipeline 200 is shown. In one embodiment, graphics processing pipeline 200 is implemented by GPU 130 (of FIG. 1). In other embodiments, graphics processing pipeline 200 can be implemented using other types of processing hardware (e.g., FPGA, ASIC, DSP, multi-core processor). Generally speaking, graphics processing pipeline 200 can be implemented using any suitable combination of software and/or hardware. Pipeline architectures can perform long latency operations more efficiently by splitting up an operation into multiple stages, with the output of each stage feeding the input of the subsequent pipeline stage. The shader units 205A-N in pipeline 200 can include a vertex shader, geometry shader, fragment shader, pixel shader, and/or one or more other shaders coupled to cache/memory 210. Cache/memory 210 is representative of any type and number of cache or memory devices. One or more of the shader units 205A-N shown in pipeline 200 is configured to perform a hybrid anti-aliasing resolve operation as described in further detail below. This shader unit receives an image, texture, or other input pixel data, and the shader unit performs a hybrid anti-aliasing resolve operation on the image to produce an anti-aliased image as output. Depending on the embodiment, the anti-aliased image can be driven to the display, written back to memory, or processed by one or more additional shader units.

Figure 3:
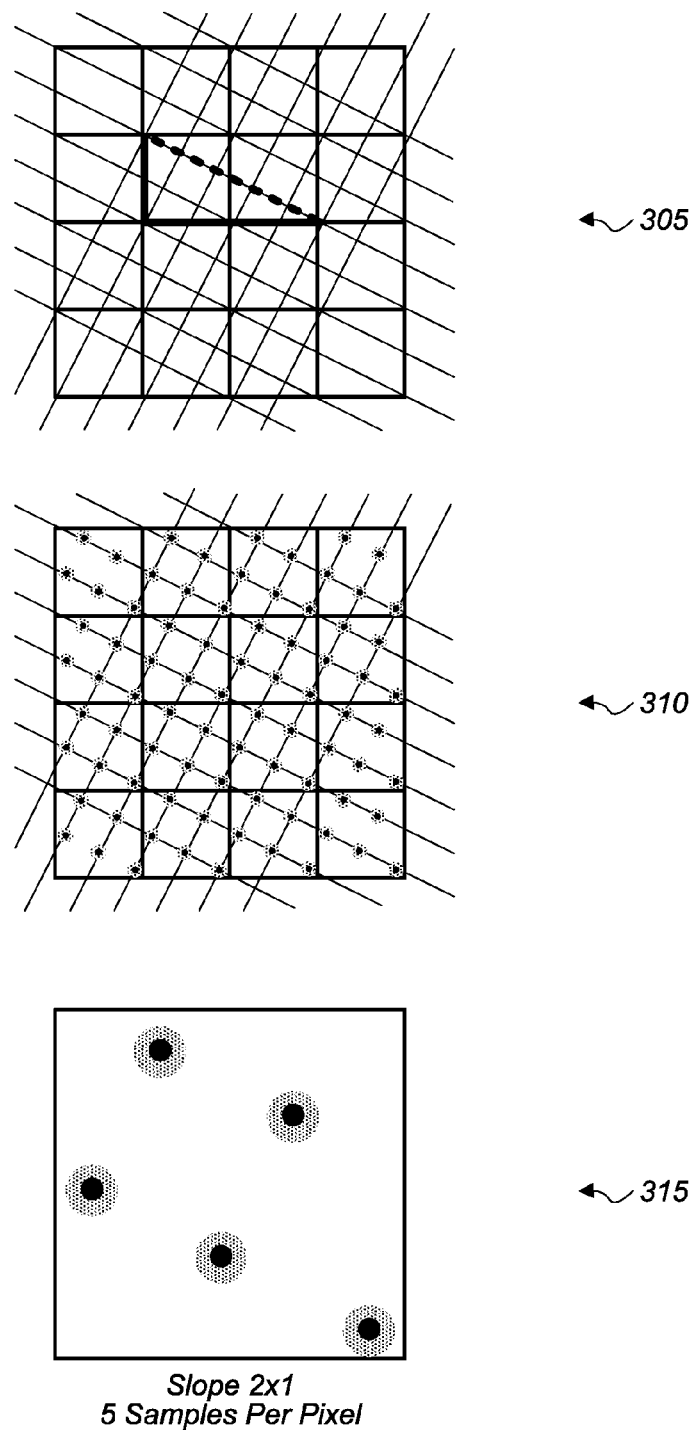
FIG. 3 illustrates diagrams of a sub-pixel sampling pattern in accordance with one embodiment.

Referring now to FIG. 3, diagrams of one embodiment of a sub-pixel sampling pattern is shown. Diagram 305 is shown at the top of FIG. 3, with diagram 305 including a 4×4 pixel square grid with horizontal and vertical lines indicating the borders of the pixels. Each square in the grid represents a pixel of a source image. In one embodiment, a sub-pixel sampling pattern is generated by drawing a first set of lines with a slope of 2×1 through the corners of the pixels. It is noted that first set of lines with a slope of 2×1 are parallel to the diagonal of a rectangle which is two pixels wide and one pixel high. As used herein, the term "slope of 2×1" corresponds to a slope of −½ according to the traditional mathematical definition of slope. Generally speaking, when a set of lines are described as having a slope of N×M, the traditional definition of slope for these lines will be −M/N. Then, a second set of lines are drawn perpendicular to the first set of lines, with the first and second sets of lines creating a rotated grid on top of the 4×4 pixel square grid.

The sub-pixel sampling locations are selected to coincide with the vertices (i.e., intersections) of the first and second sets of lines of the rotated grid. It is noted that while the discussion herein describes "drawing" lines to create a sampling pattern, the first and second sets of parallel lines of the rotated grid do not actually have to be drawn to generate the sub-pixel sampling pattern. Rather, the lines can be mathematically determined (e.g., calculating equations for the lines) so as to generate the sub-pixel sampling pattern.

Then, in one embodiment, as shown in diagram 310, the rotated grid is shifted to cause the center of gravity of the sub-pixel sampling locations for each original pixel to be in the center of the original pixel. For example, in one embodiment, the grid is shifted such that the value of $(X_1+X_2+ \ldots X_N)/N$ is equal to the center of the original pixel for the x coordinate and using a similar equation for the Y coordinates of the sub-pixels, with N equal to the number of sub-pixel samples. It is noted that this step of shifting the rotated grid to cause the center of gravity of the sub-pixel sampling locations for each original pixel to be in the center of the original pixel can be omitted in other embodiments. The sub-pixel sampling locations are indicated in diagram 310 by the circles at the intersections of the first and second sets of lines. In another embodiment, the sub-pixel sampling pattern is generated by drawing a rotated regular sampling grid through the centers of the original pixels and then optionally shifted. When the grid is drawn through the centers of the pixels, then one of the sub-pixel samples will be in the center of the pixel, the center of gravity of sub-pixel samples will be in the center of the pixel, and the sub-pixel sampling pattern will be symmetrical around the center of the pixel. For example, if the center of the pixel has coordinates (0,0), then for a sub-pixel sample at coordinates (a,b), there will be another sub-pixel sample at coordinates (−a,−b). The sub-pixel sampling locations for a single pixel are shown in diagram 315.

In one embodiment, the sub-pixel sampling pattern shown in diagram 310 is used to generated sub-pixel sampling coordinates for the underlying image. These coordinates are then used to determine which sub-pixel locations to sample within the image being rendered by a processor (e.g., GPU). In one embodiment, the coordinates are generated in accordance with a Cartesian coordinate system with each sampling point specified by a pair of numerical coordinates. In one embodiment, the numerical coordinates are stored as floating point (e.g., single precision floating point, double precision floating point) values. In other embodiments, the numerical coordinates are stored using other types of representations (e.g., fixed point, integer).

The technique of sampling multiple separate locations within a single pixel can be referred to as "sub-pixel sampling" or as "multisampling anti-aliasing" (MSAA). In some cases, sampling multiple separate locations within a single pixel can be referred to as "subsampling". It should be understood that "subsampling" in this context has a different meaning than when the term "subsampling" is used to describe signal processing techniques. Within the field of signal processing, the term "subsampling" is defined as reducing the sampling rate of a signal. Within this disclosure, the term "sub-pixel sampling" will be used to describe sampling multiple separate locations within a single pixel to avoid any confusion.

For example, the pattern shown in diagram 315 can be referred to as a 5×MSAA sampling pattern. This pattern is constructed by drawing a first set of lines with a 2×1 slope, with each line of the first set of lines drawn through the original pixel square grid traversing two horizontal pixels for each vertical pixel. Then, a second set of lines are drawn perpendicular to the first set of lines, with the intersections of the lines determining sub-pixel sampling locations, resulting in $2^2+1^2=5$ sub-pixel samples per pixel. This sampling pattern can be shifted, rotated by 90 degrees, and mirrored. This sampling pattern, and any adjustments, can be utilized for various applications in temporal anti-aliasing.

Figure 4:
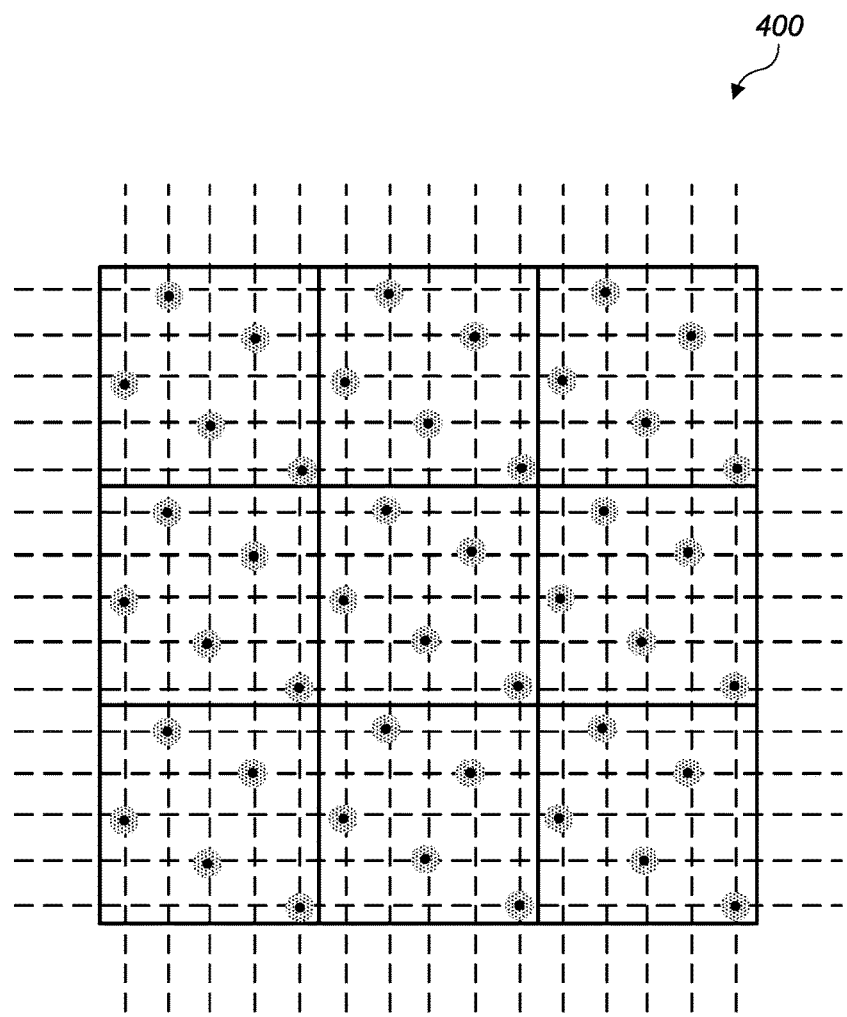
FIG. 4 illustrates a diagram of the 5×MSAA sampling pattern in accordance with one embodiment.

Turning now to FIG. 4, a diagram 400 of the 5×MSAA sampling pattern is shown. The discussion of FIG. 4 is a continuation of the discussion regarding FIG. 3. The dots shown in diagram 400 of FIG. 4 represent the sub-pixel sampling locations for determining the locations at which to calculate the value of any of various parameters (e.g., color, depth, stencil, transparency) of an image. As shown in diagram 400, the vertical and horizontal lines which are drawn to intersect with these sub-pixel sampling locations illustrate that the 5×MSAA sampling pattern satisfies the regular rectangular grid condition since samples are regularly spaced both horizontally and vertically. The 5×MSAA sampling pattern also satisfies the one-sample-per-horizontal/vertical line condition, since there is only one sub-pixel location sampled per pixel on a given horizontal or vertical line which traverses the image. Satisfying the one-sample-per-horizontal/vertical line condition can enhance the anti-aliasing properties of the pattern by allowing improved representation of vertical and horizontal lines at the sub-pixel level within the image.

The 5×MSAA sampling pattern is superior to a standard 2×2 rotated grid super sampling (RGSS) pattern in multiple ways. For example, the 5×MSAA pattern produces four intermediate colors for horizontal and vertical lines instead of three. The 5×MSAA sampling pattern also ensures uniform sub-pixel sampling throughout the image. The 5×MSAA sampling pattern can be shifted, including shifted across pixel boundaries, and mirrored while still retaining both regular grid quality and the one-sample-per-horizontal/vertical-line quality of the pattern. The 5×MSAA sampling pattern can be advantageous when implementing various temporal anti-aliasing techniques.

Figure 5:
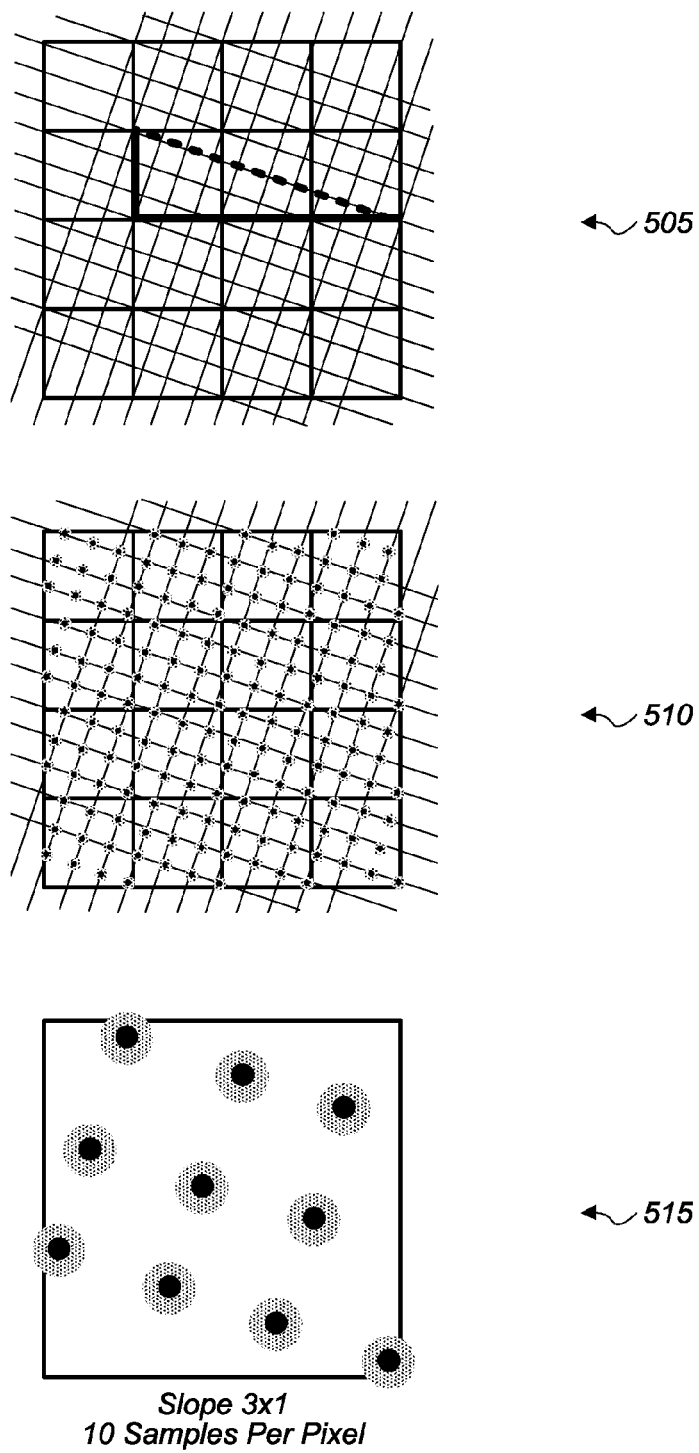
FIG. 5 illustrates diagrams of a 10×MSAA sub-pixel sampling pattern in accordance with one embodiment.

Referring now to FIG. 5, diagrams of a 10×MSAA sub-pixel sampling pattern are shown. Diagrams 505, 510, and 515 are generated in a similar manner to the diagrams 305, 310, and 315 shown in FIG. 3. The 10×MSAA sampling pattern shown in diagrams 505, 510, and 515 is constructed from a first set of lines with a 3×1 slope and a second set of lines perpendicular to the first set of lines, resulting in $3^2+1^2=10$ samples in each pixel of the image.

To create diagram 505, first a square pixel grid of the original pixels of an image is generated. The grid includes vertical and horizontal lines at the borders of the pixels of the source image. Then, a first set of lines are drawn through the corners of the pixel grid with a slope of −⅓, with each line passing through three horizontal pixels for each vertical pixel. Then, a second set of lines, perpendicular to the first set of lines, are drawn through the corners of the pixel grid. The second set of lines have a slope of 3, with each line passing through three vertical pixels for each horizontal pixel. The first set of lines and second set of lines can be referred to as a rotated grid.

Next, as shown in diagram 510, the rotated grid is shifted so that the vertices (i.e., intersections) of the first set of lines and second set of lines within each original pixel have a center of gravity at the center of the original pixel. Then, the coordinates of the vertices are programmed into the graphics hardware (e.g., GPU) to be utilized as the sub-pixel sampling coordinates of the image. Diagram 515 illustrates the sub-pixel sampling locations for a single pixel. In another embodiment, the first and second sets of lines are drawn through the centers of the pixels of the grid rather than through the corners of the pixel grid.

Figure 6:
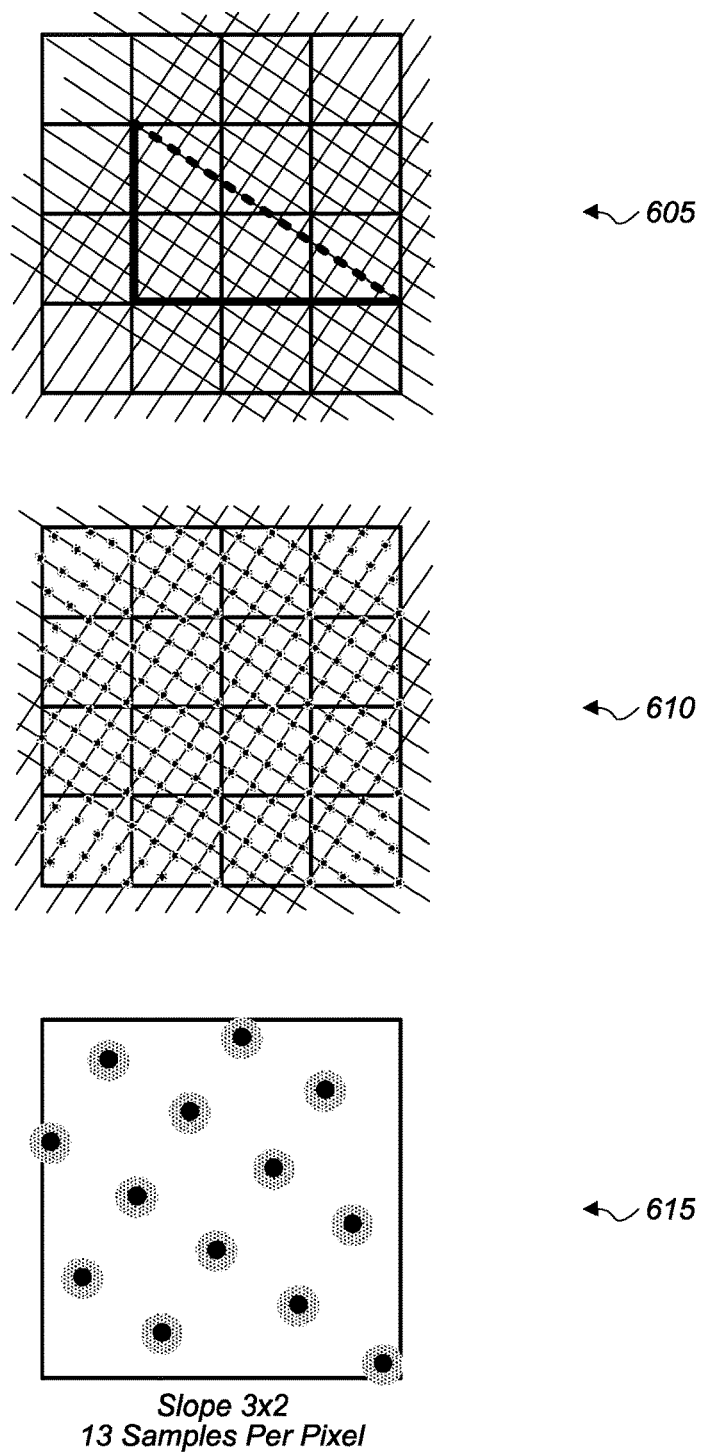
FIG. 6 illustrates diagrams of a 13×MSAA sub-pixel sampling pattern in accordance with one embodiment.

Turning now to FIG. 6, diagrams of a 13×MSAA sub-pixel sampling pattern are shown. Diagrams 605, 610, and 615 are generated in a similar manner to the diagrams 305, 310, and 315 shown in FIG. 3 and diagrams 505, 510, and 515 shown in FIG. 5. The 13×MSAA sampling pattern shown in diagrams 605 and 610 is constructed based on lines with a 3×2 slope, resulting in $3^2+2^2=13$ samples in each pixel of the image. Diagram 615 illustrates the 13 sub-pixel sample locations for a single pixel.

Figure 7:
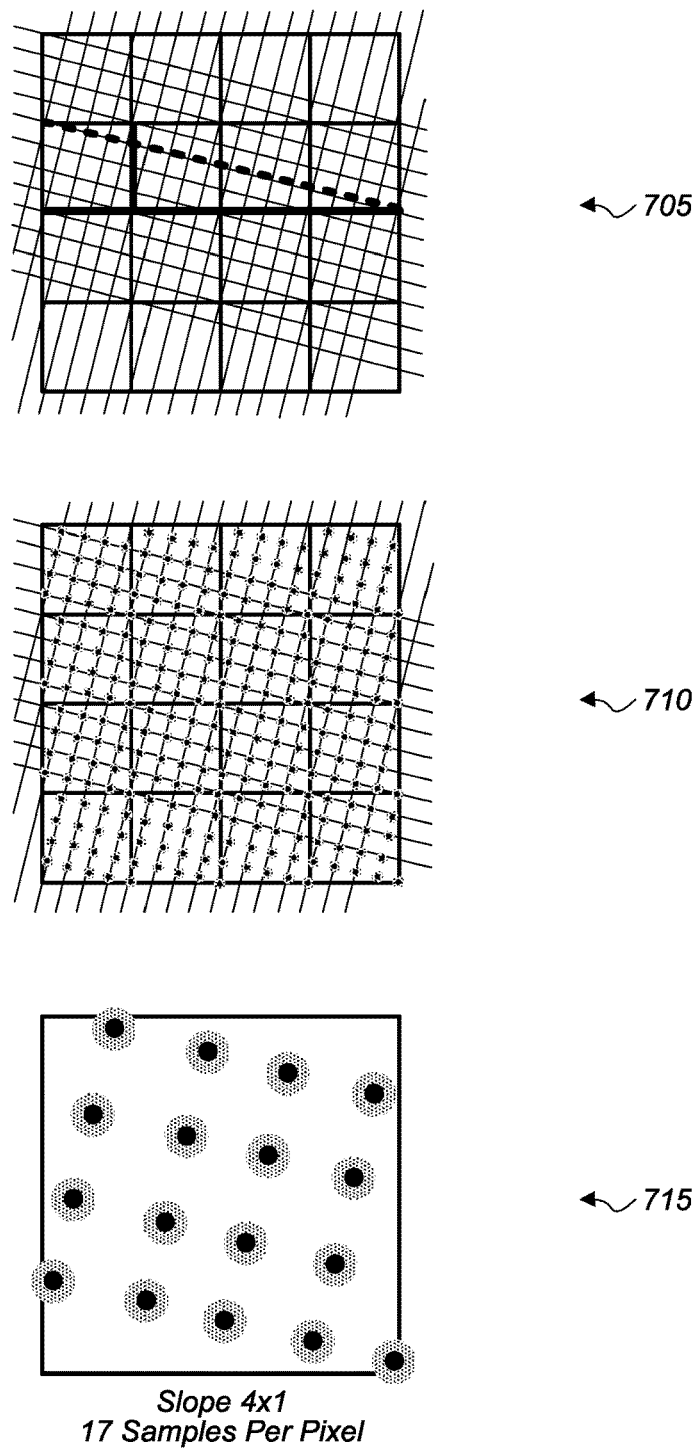
FIG. 7 illustrates diagrams of a 17×MSAA sub-pixel sampling pattern in accordance with one embodiment.

Referring now to FIG. 7, diagrams of a 17×MSAA sub-pixel sampling pattern are shown. Diagrams 705, 710, and 715 are generated in a similar manner to the previous diagrams. The 17×MSAA sampling pattern shown in diagrams 705 and 710 is constructed based on lines with a 4×1 slope, resulting in $4^2+1^2=17$ samples in each pixel of the image. Diagram 715 illustrates the 17 sub-pixel sample locations for a single pixel.

Additional patterns can also be generated in a similar way to the patterns shown in FIGS. 3 and 5-7. In one embodiment, when generating additional patterns, the slope generating numbers (e.g., 3×1) are mutually prime (co-prime) so that the patterns satisfy the one-sample-per-horizontal/vertical-line condition. In other words, the greatest common divisor between the slope generating numbers should be one. For example, additional pattern options which meet this condition include 4×3 with 25 sub-pixel samples per pixel (sspp), 5×1 with 26 sspp, 5×2 with 29 sspp, 5×3 with 34 sspp, 5×4 with 41 sspp, 6×1 with 65 sspp, etc.

Figure 8:
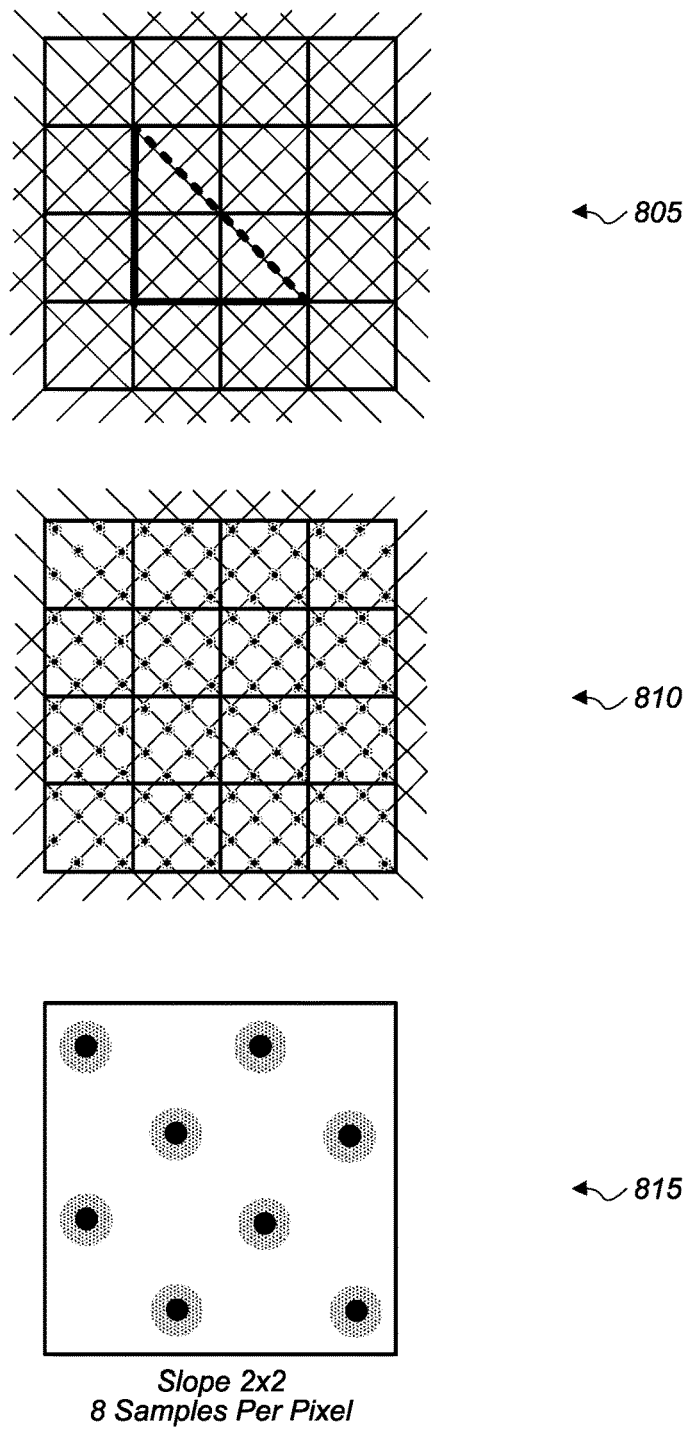
FIG. 8 illustrates diagrams of a sampling pattern with 8 sub-pixel sampling points per original pixel in accordance with one embodiment.

Turning now to FIG. 8, diagrams of a sampling pattern with 8 sub-pixel sampling points per original pixel are shown. Diagrams 805 and 810 illustrate a sub-pixel sampling pattern with non-mutually-prime slope generating numbers 2×2. Accordingly, the 8×MSAA sampling pattern shown in diagrams 805 and 810 is constructed based on lines with a 2×2 slope. The resulting pattern includes 8 sub-pixel samples per pixel as shown in diagram 815. For this 8 sub-pixel sampling pattern, there are 2 samples per pixel for each vertical and horizontal line. Accordingly, when anti-aliasing horizontal and vertical lines that are displayed in the source image, only 3 intermediate tones will be generated, which is less than the 4 intermediate tones generated by the 5×MSAA pattern shown in FIG. 3. However, the 8×MSAA pattern can be implemented efficiently for hybrid anti-aliasing resolve operations as will be described in further detail below. Another version of the 8×MSAA pattern can be generated from a non-rotated rectangular grid 4×2, with this other version also able to be implemented efficiently for hybrid anti-aliasing resolve operations.

Figure 9:
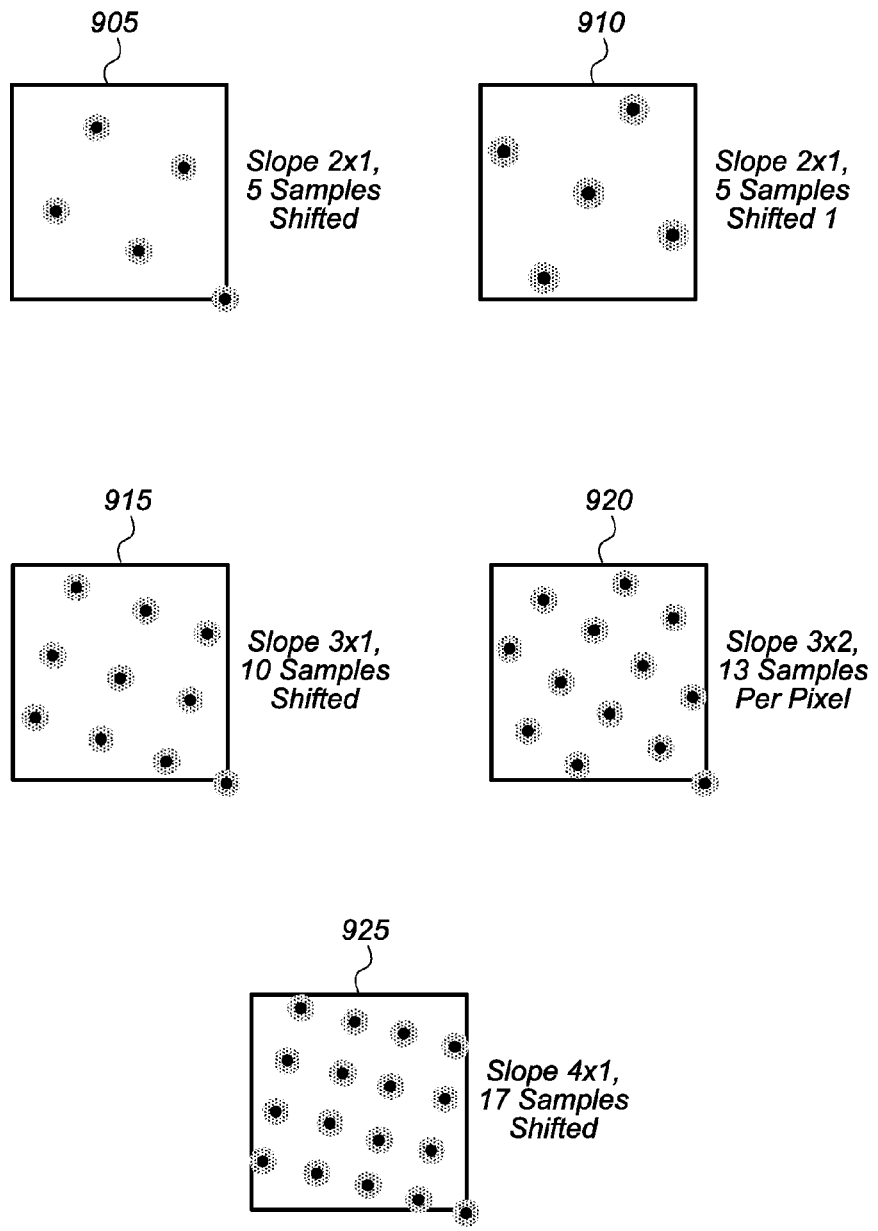
FIG. 9 illustrates diagrams of pixel-sharing patterns in accordance with various embodiments.

Referring now to FIG. 9, diagrams of pixel-sharing patterns are shown. The previously described patterns shown in FIGS. 3 and 5-8 can be shifted in such a way that one sub-pixel sampling location falls onto a corner or in the center of the source pixel. For example, diagram 905 shows a 5× sub-pixel sampling pattern, based on a slope of 2×1, with the sub-pixel sampling locations shifted so that one of the locations coincides with the lower right corner of the source pixel. The shifting of the pattern allows the sub-pixel location on the lower right corner of the pixel to be shared among four adjacent pixels. Diagram 910 illustrates an alternate configuration for the 5× sub-pixel sampling pattern. Diagram 910 illustrates the 5× sub-pixel sampling pattern shifted so that one of the sub-pixels is aligned with the center of the pixel.

Diagram 915 illustrates a 10× sub-pixel sampling pattern with a slope of 3×1, with the sub-pixel sampling pattern shifted so that one of the sub-pixel sampling locations falls on the lower-right corner of the pixel. Diagram 920 illustrates a 13× sub-pixel sampling pattern with a slope of 3×2, with the sub-pixel sampling pattern shifted so that one of the sub-pixel sampling locations falls on the lower-right corner of the pixel. Diagram 925 illustrates a 17× sub-pixel sampling pattern with a slope of 4×1, with the sub-pixel sampling pattern shifted so that one of the sub-pixel sampling locations falls on the lower-right corner of the pixel. Each of these sampling patterns allows one of the sub-pixel sampling locations to be shared among four adjacent pixels. Accordingly, four fragments will be accessed during the resolve operation rather than one fragment.

In some embodiments, creating a surface that contains 5, 10, 13, or 17 samples per fragment might not be optimal in terms of the actual hardware implementation. However, different types of workarounds can be implemented allowing these patterns with 5, 10, 13, or 17 samples per fragment to be efficiently implemented on existing or future hardware. For example, an 8× coverage sampling anti-aliasing (CSAA) pattern or a 4× enhanced quality anti-aliasing (EQAA) pattern each have eight coverage samples. In one embodiment, the 8×CSAA pattern or the 4×EQAA pattern can be implemented to generate the 5× sub-pixel sampling pattern illustrated shown in diagrams 310 and 315 of FIG. 3. For 8×CSAA pattern or the 4×EQAA pattern, the extra three coverage samples are positioned to coincide with three of the first five positions of the 5× pattern. These extra sub-pixel samples are then depth-culled in the early stages of the rendering pipeline and thus will not waste rendering time. Alternatively, the hardware is configured to not calculate the unnecessary sub-pixel samples. This same approach can be implemented by using an existing 16× sub-pixel sampling mode (e.g., 16×CSAA, 16× Quincunx CSAA (QCSAA), 16×EQAA) to support a 10× or 13× sub-pixel sampling pattern.

In another embodiment, when implementing a 5× sub-pixel sampling pattern, two surfaces are utilized for storage, with one surface implementing a 4× sub-pixel sampling pattern and the other surface implementing a 1× sub-pixel sampling pattern. In a similar manner, a 10× sub-pixel sampling pattern can be utilized by implementing an 8× sub-pixel sampling pattern surface and a 2× sub-pixel sampling pattern surface. Additionally, a 13× sub-pixel sampling pattern can consist of a 12× sub-pixel sampling pattern surface and a 1× sub-pixel sampling pattern surface, or the 13× sub-pixel sampling pattern can consist of a 8× sub-pixel sampling pattern surface, a 4× sub-pixel sampling pattern surface, and a 1× sub-pixel sampling pattern surface. Also, a 17× sub-pixel sampling pattern can be implemented using a 16× sub-pixel sampling pattern surface and a 1× sub-pixel sampling pattern surface.

In a further embodiment, one of the samples in a sub-pixel sampling pattern can be omitted from the pattern. For example, for a 17× sub-pixel sampling pattern, only 16 sub-pixel sample locations can be calculated. The omitting of sampling locations can cause holes in the regular grid pattern, but these holes could be programmatically interpolated during the resolve operation. In one embodiment, a GPU is able to programmatically change the sub-pixel sampling patterns, but there could be a specific granularity to the positions of the samples. For example, a grid of 16×16 possible positions inside of the pixel can be available in one embodiment. Accordingly, some of the patterns described herein might not be capable of being implemented with absolute procession, but an approximated pattern where sample positions are adjusted to the closest grid points can be implemented and yield suitable results.

Figure 10:
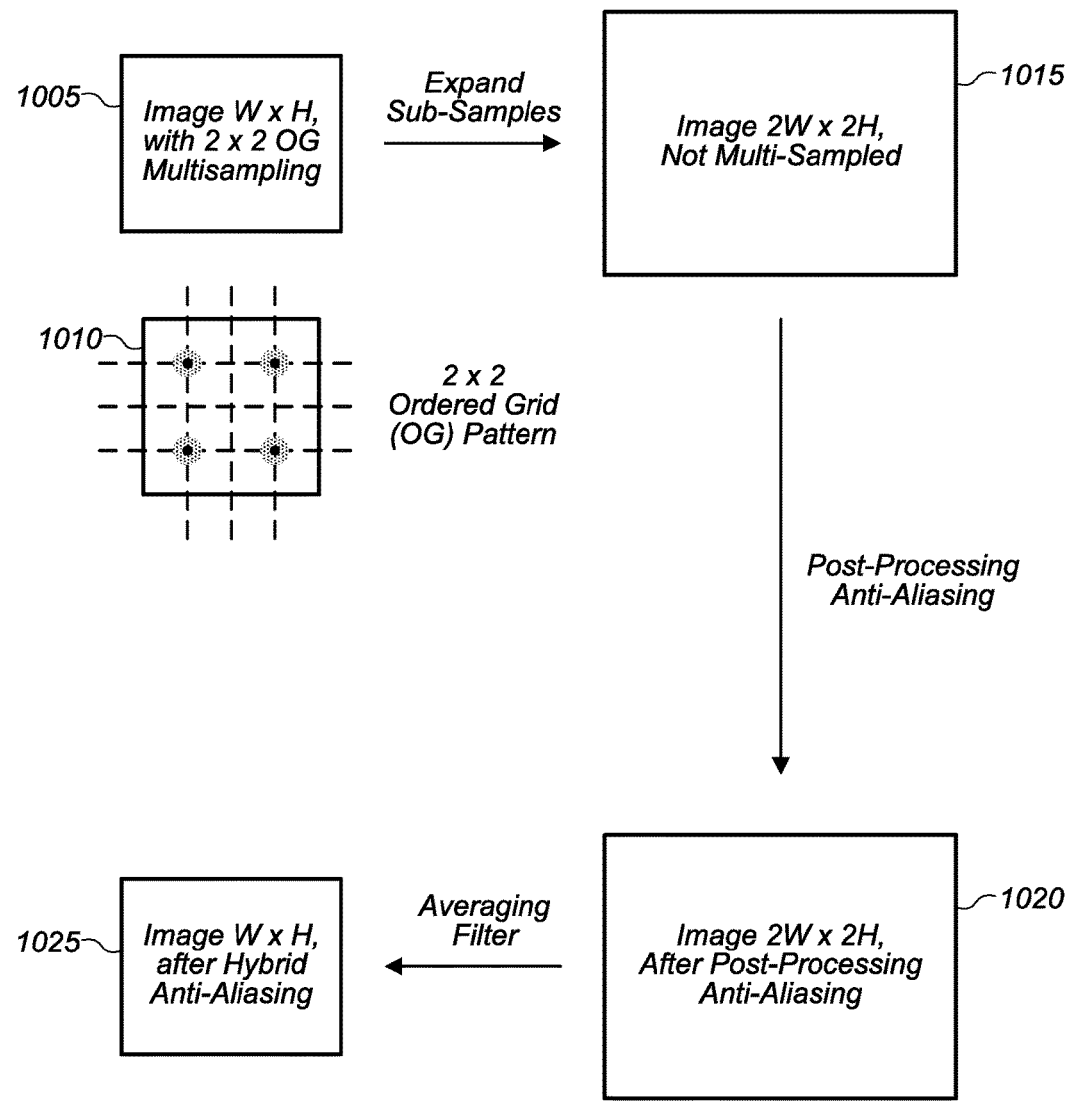
FIG. 10 illustrates a diagram of one embodiment of a hybrid anti-aliasing scheme.

Turning now to FIG. 10, a diagram of one embodiment of a hybrid anti-aliasing scheme is shown. Generally speaking, there are typically two families of anti-aliasing algorithms: multi-sampling anti-aliasing and post-processing anti-aliasing. These two methods are typically mutually exclusive. A pass of post-processing anti-aliasing can be applied to an image resolved from a multi-sampled image. Typically, the resultant image will become blurry and possibly worse than before. However, the techniques described herein for implementing hybrid anti-aliasing schemes are an improvement on the prior art.

In one embodiment, a hybrid anti-aliasing scheme starts with a multi-sampled image, where the sub-pixel sampling pattern generates a regular grid within the image. Any of the previously described sub-pixel sampling patterns (e.g., 5×, 10×, 13×, 17×) can be utilized. Next, the multi-sampled image is expanded to an image at the sub-pixel sampling resolution. Then, a post-processing anti-aliasing algorithm is used to filter the expanded image. Finally, the filtered expanded image is averaged back to an image at the original resolution. This approach can be implemented on current graphics processing hardware (e.g., a GPU). For example, the sub-pixel sampling locations can be programmed in the GPU to support the new sub-pixel sampling pattern. This approach works with rotated and non-rotated grid patterns. In some embodiments, this approach can be combined with temporal filter techniques as well as with reprojection techniques. In one embodiment, existing games can utilize the hybrid anti-aliasing scheme by updating graphics driver software.

In one embodiment, a hybrid anti-aliasing scheme can be implemented for the scenario shown in the block diagram of FIG. 10. In this embodiment, image 1005 with dimensions width (W) by height (H) utilizes multi-sampling (i.e., sub-pixel sampling) based on a 2×2 ordered grid (OG) as shown in diagram 1010. Image 1005 is expanded by treating the sub-pixels as if they were regular pixels. The resultant image 1015 has dimensions 2W by 2H. In one embodiment, tone mapping for high dynamic range (HDR) textures is integrated into the expansion step.

Next, image 1015 is processed by a post-processing anti-aliasing filter to generate image 1020. Also, in some embodiments, additional post-processing, such as sharpening, is applied to the expanded image 1015. Then, an averaging filter is utilized to generate image 1025 from image 1020. It is noted that images 1005, 1015, 1020, and 1025 can also be referred to as textures. In one embodiment, the averaging filter is a box averaging filter (e.g., 2×2 box averaging filter). In other embodiments, other types of averaging filters (e.g., tent filter) can be utilized. Additionally, the averaging filter can include inverse tone mapping for high dynamic range (HDR) textures, sharpening, and/or others. It is noted that image 1025 has the same dimensions, W by H, as the original image 1005. In other embodiments, the averaging filter can change the resolution of image 1025 to a different resolution than the original image 1005. Alternatively, the downscaling step using the averaging filter can be omitted, with the resultant image having a larger resolution than the starting image.

Figure 11:
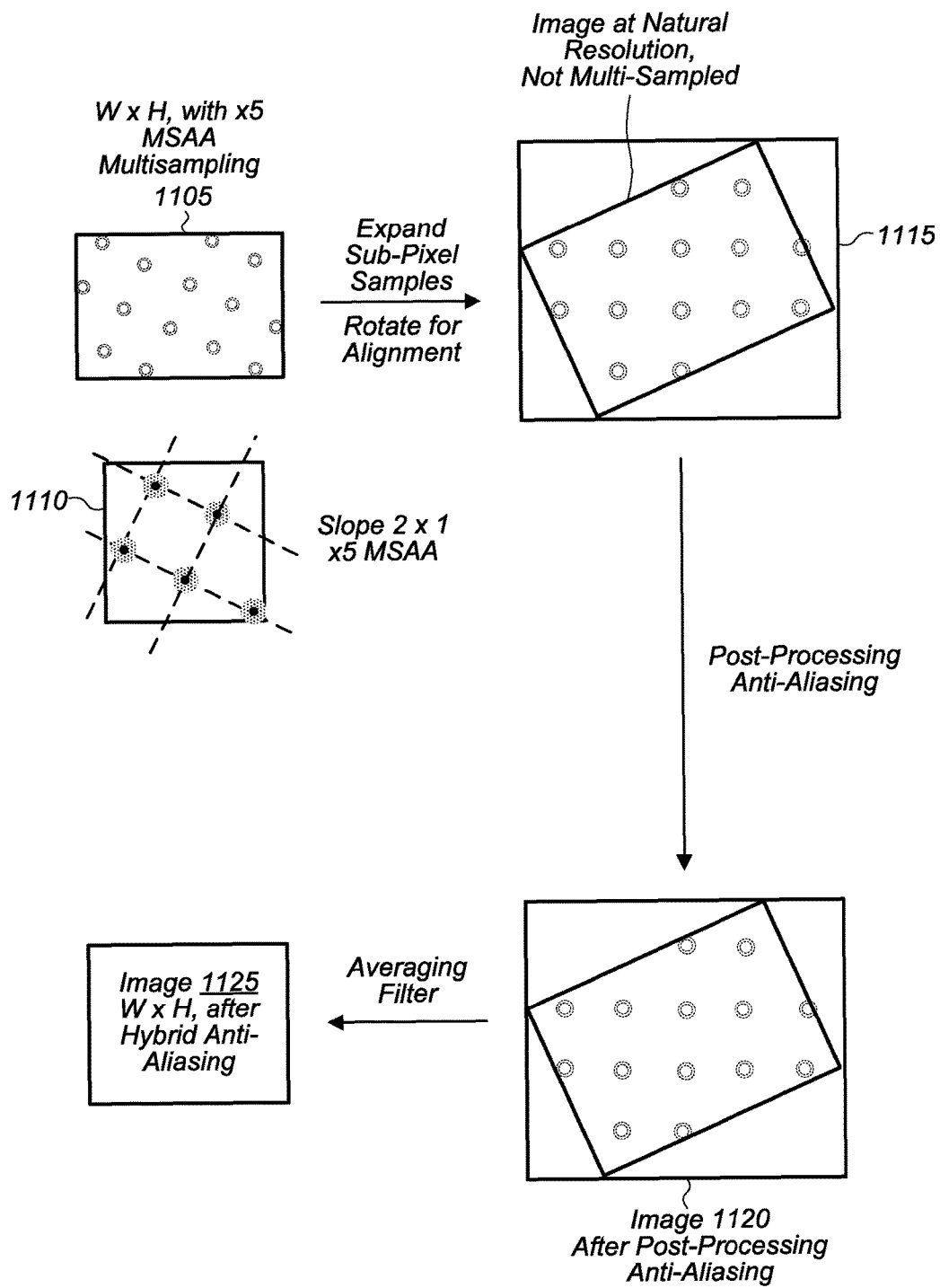
FIG. 11 illustrates a diagram of another embodiment of a hybrid anti-aliasing scheme.

Referring now to FIG. 11, a diagram of another embodiment of a hybrid anti-aliasing scheme is shown. In one embodiment, a hybrid post-processing, anti-aliasing scheme is applied to image 1105, which is representative of any type of image, texture, surface, or other pixel data. Image 1105 has dimensions of W by H, and image 1105 utilizes a ×5 MSAA sub-pixel sampling pattern based on a slope of 2×1 as shown in diagram 1110. The sub-pixel samples of image 1105 are expanded and then rotated for alignment to generate image 1115, which is the image at its natural resolution without multi-sampling. In other words, the sub-pixels of image 1105 are treated as pixels in image 1115. Also, the pixels are rotated so that the pixels in image 1115 form a regular, rectangular grid.

Next, a post-processing, anti-aliasing filtering step is performed on image 1115 to generate image 1120. Then, an averaging filter step is performed on image 1120 to generate image 1125, which has the same dimensions W×H as the original image 1105. In another embodiment, the averaging filter step can be omitted, and image 1120 can be the result of the hybrid anti-aliasing resolve operation. Alternatively, in a further embodiment, the averaging filter can average image 1120 so that the resolution of image 1125 is greater than the original resolution W×H of image 1105.

Figure 12:
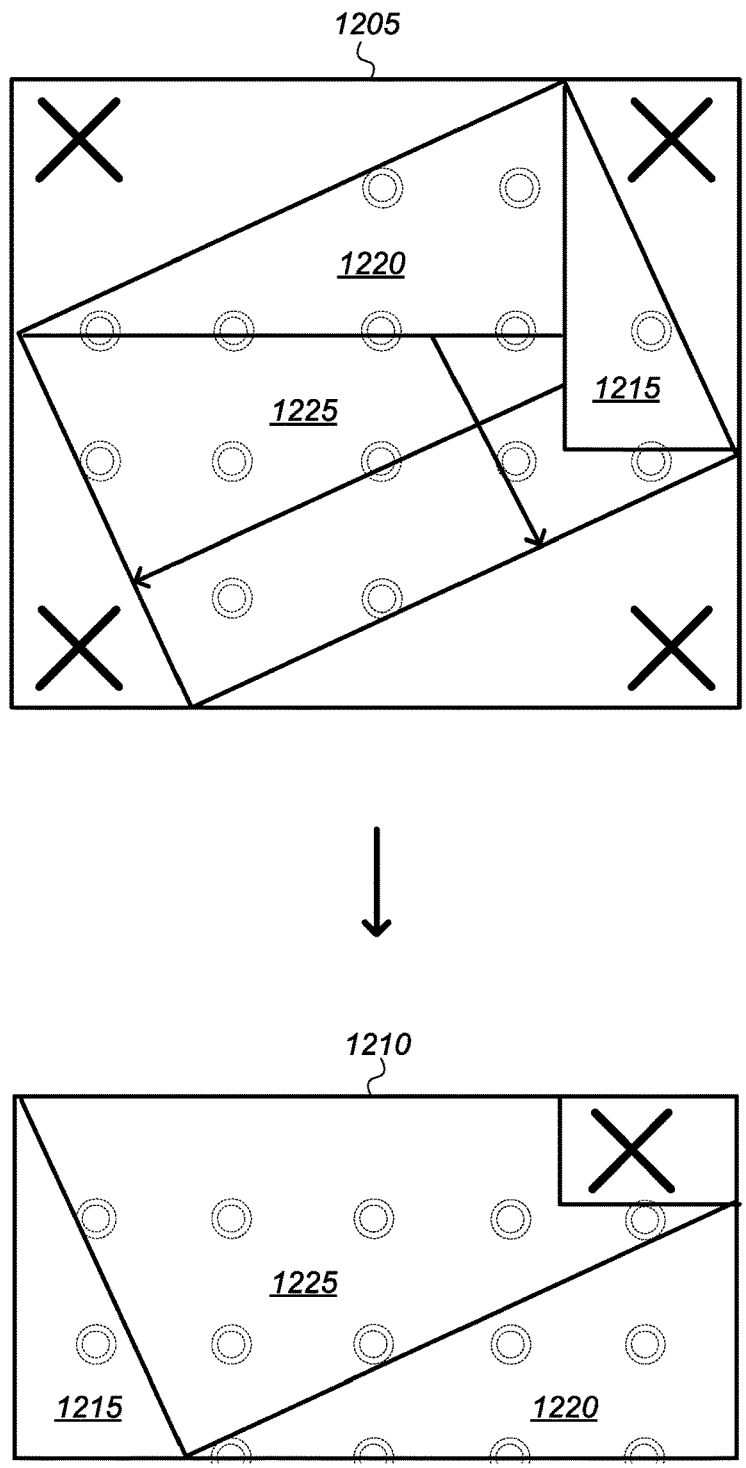
FIG. 12 illustrates a diagram of a technique for reducing the size of an expanded image.

Turning now to FIG. 12, a diagram of a technique for reducing the size of an expanded image is shown. Image 1205 is an example of an expanded image similar to image 1115 in FIG. 11. Image 1205 includes an expanded and rotated image created from a sub-pixel sampled image (not shown). However, each of the areas containing an "X" within image 1205 are unused areas that will use additional memory.

Accordingly, in one embodiment, instead of processing image 1205 in its current state, the portions of image 1205 are rearranged to create image 1210 which results in a more efficient usage of space. To rearrange portions into a more space-efficient image 1210, triangular portion 1215 is moved from the right-side of image 1205 to the left-side of image 1210. Also, triangular portion 1220 is moved from the top of image 1205 to the bottom right of image 1210. In the upper right portion of image 1210 there is still a small portion of unused space which is marked with an "X". However, this is much smaller than the amount of unused space in image 1205. Within image 1210, portions 1215, 1220, and 1225 fit together in a more efficient arrangement with less wasted space. This will allow the next post-processing, anti-aliasing step to be performed more efficiently on image 1210 than on image 1205.

It is noted that when rearranging the image by moving the portions around, some overlap can be included with each portion to allow the post-processing algorithms to be performed. For example, if the post-processing algorithm samples five pixels around the center pixel, then an overlap of five pixels is added to the portions 1215, 1220, and 1225 as they are combined to form image 1210. It is also noted that the rearranging of portions 1215, 1220, and 1225 can be performed during the expansion of the sub-pixels stage. Accordingly, the rearranging of portions 1215, 1220, and 1225 does not need an additional rendering pass. It is further noted that the use of alternate triangle subdivision and/or alternate rearrangement patterns are possible and are contemplated.

Figure 13:
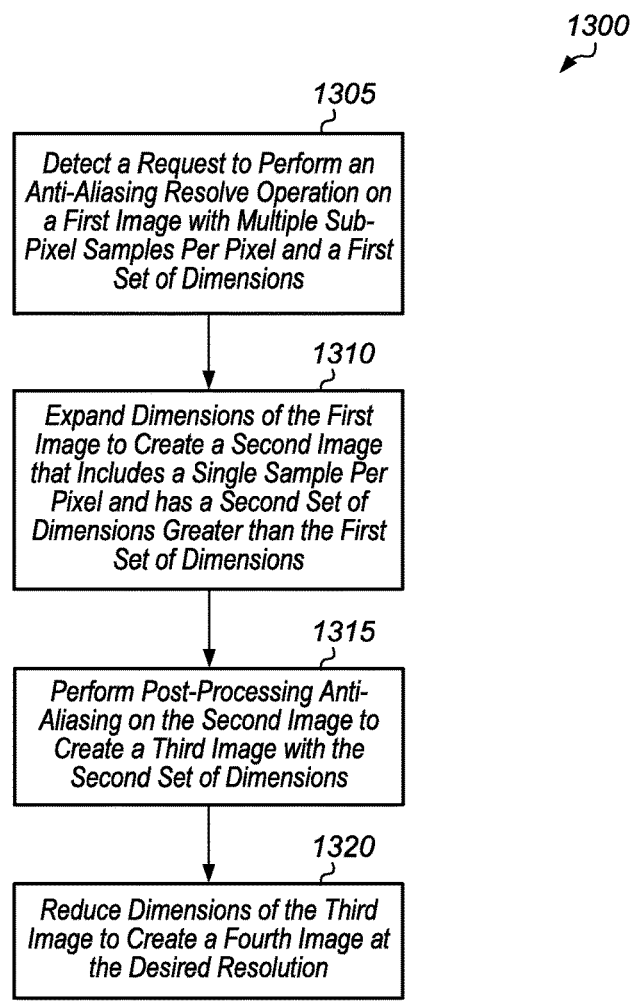
FIG. 13 is a generalized flow diagram illustrating one embodiment of a method for performing a hybrid anti-aliasing resolve operation.

Referring now to FIG. 13, one embodiment of a method 1300 for performing a hybrid anti-aliasing resolve operation is shown. For purposes of discussion, the steps in this embodiment and those of FIG. 14-17 are shown in sequential order. However, it is noted that in various embodiments of the described methods, one or more of the elements described are performed concurrently, in a different order than shown, or are omitted entirely. Other additional elements are also performed as desired. Any of the various systems, apparatuses, or computing devices described herein are configured to implement method 1300.

A processor detects a request to perform an anti-aliasing resolve operation on a first image with multiple sub-pixel samples per pixel and a first set of dimensions (block 1305). In one embodiment, the processor is a GPU. In other embodiments, the processor is any of various other types of processors ((e.g., DSP, FPGA, ASIC, multi-core processor). Depending on the embodiment, the first image can be a texture, surface, or other type of pixel data being processed by the processor.

In response to detecting the request, the processor expands dimensions of the first image to create a second image that includes a single sample per pixel and has a second set of dimensions greater than the first set of dimensions (block 1310). In one embodiment, expanding dimensions of the first image involves converting sub-pixels of the first image into regular pixels of the second image. In other words, the sub-pixels of the first image will be treated as if they were actual pixels of the second image. The expansion of the dimensions of the first image will vary according to the number of sub-pixels sampling locations per pixel of the first image. It is noted that expanding dimensions of the first image to create a second image can be performed virtually by performing subsequent calculations as if the first image were expanded without actually doing the expansion and without creating a second image. In some embodiments, in addition to expanding dimensions of the first image, the first image is also rotated. In these embodiments, the rotation is performed to align the sub-pixels of the first image into a vertical and horizontal grid pattern within the second image.

Next, the processor performs post-processing anti-aliasing on the second image to create a third image with the second set of dimensions (block 1315). In some embodiments, block 1315 can be performed virtually without actually creating the third image. The processor utilizes an anti-aliasing filter to perform the anti-aliasing processing. The anti-aliasing filter can also be referred to as a post-processing, anti-aliasing filter. In one embodiment, the anti-aliasing filter is based on the fast approximate anti-aliasing (FXAA) algorithm. In other embodiments, the anti-aliasing filter can utilize other algorithms for filtering the second image to create the third image. Generally speaking, an anti-aliasing filter analyzes a central pixel and then the surrounding pixels to determine if there are any unwanted aliasing effects (i.e., jaggies) that will be displayed in the vicinity of the central pixel. If the anti-aliasing filter detects the presence of artifacts for the central pixel, the value of the central pixel can be averaged with the neighboring pixels.

Then, the processor reduces dimensions of the third image to create a fourth image at the desired resolution (block 1320). In one embodiment, reducing dimensions involves performing an averaging of the third image to create the fourth image. In one embodiment, the averaging of the third image can be performed in-place without creating a fourth image. It is noted that depending on the embodiment, subsequent to block 1320, the fourth image can be written back to memory, the fourth image can undergo additional processing, and/or the fourth image can be driven to a display. In one embodiment, the fourth image has a same resolution as the first image. In another embodiment, the fourth image has a higher resolution than the first image. In some embodiments, block 1320 can be omitted from method 1300, with the third image being the result of the anti-aliasing resolve operation. For example, in some applications (e.g., virtual reality (VR) applications), having access to a higher resolution image can be useful when warping (i.e., reprojecting) the rendered image before sending it to the display to correct for head movement which occurred after the rendering. After block 1320, method 1300 ends.

It should be understood that the terminology of first image, second image, third image, and fourth image utilized in describing method 1300 is intended to distinguish between the different steps of method 1300. Each such term is meant to indicate that some processing has been applied to a source image to create a modified source image. For example, when expanding dimensions of the first image to create the second image, the processor can expand the dimensions virtually by performing subsequent calculations as if the first image were expanded and without actually creating a second image. Additionally, when the processor performs an averaging of the third image, the processor can overwrite the third image with the averaged version of the third image. From this perspective, the third image can be averaged and then the output of the averaging can still be called the third image. However, for the purposes of clarity, the output of averaging the third image is referred to as the fourth image in method 1300 to clearly distinguish between the input and output of the averaging step. Similarly, the other steps of method 1300 can actually overwrite or modify the source image rather than creating a new image.

Figure 14:
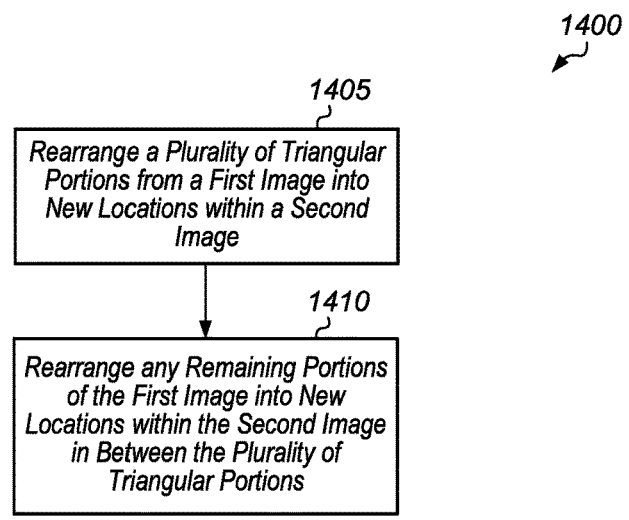
FIG. 14 is a generalized flow diagram illustrating one embodiment of a method for rearranging image portions when expanding and rotating an image.

Turning now to FIG. 14, one embodiment of a method 1400 for rearranging image portions when expanding and rotating an image is shown. A processor rearranges a plurality of triangular portions from a first image into new locations within a second image (block 1405). In one embodiment, the processor rearranges the plurality of triangular portions from the first image into new locations within the second image as part of a hybrid anti-aliasing resolve operation. When the processor expands and rotates the first image into the second image as part of the hybrid anti-aliasing resolve operation, the processor also rearranges the plurality of triangular portions from the first image into new locations within the second image. Also, the processor rearranges any remaining portions of the first image into new locations within the second image in between the plurality of triangular portions (block 1410). After block 1410, method 1400 ends. By rearranging the image portions of the first image into new locations in the second image, subsequent processing operations on the second image can be performed more efficiently by the graphics hardware.

Figure 15:
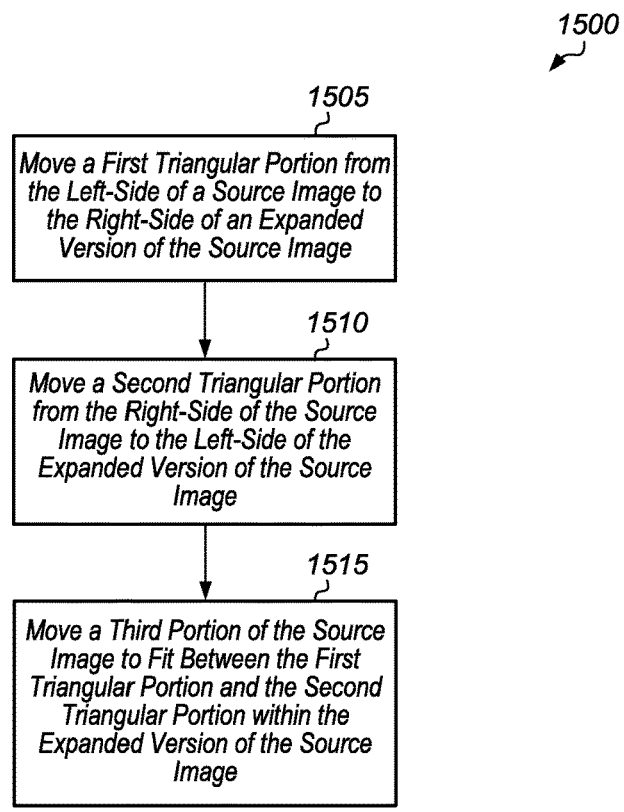
FIG. 15 is a generalized flow diagram illustrating another embodiment of a method for rearranging image portions when expanding and rotating an image.

Referring now to FIG. 15, another embodiment of a method 1500 for rearranging image portions when expanding and rotating an image is shown. A processor moves a first triangular portion from the left-side of a source image to the right-side of an expanded version of the source image (block 1505). Also, the processor moves a second triangular portion from the right-side of the source image to the left-side of the expanded version of the source image (block 1510). Still further, the processor moves a third portion of the source image to fit between the first triangular portion and the second triangular portion within the expanded version of the source image (block 1515). It is noted that in one embodiment, the processor includes an overlap of sub-pixels on the edges of the first, second, and third portions when moving the first, second, and third portions to their new positions in the expanded version of the source image. After block 1515, method 1500 ends.

Figure 16:
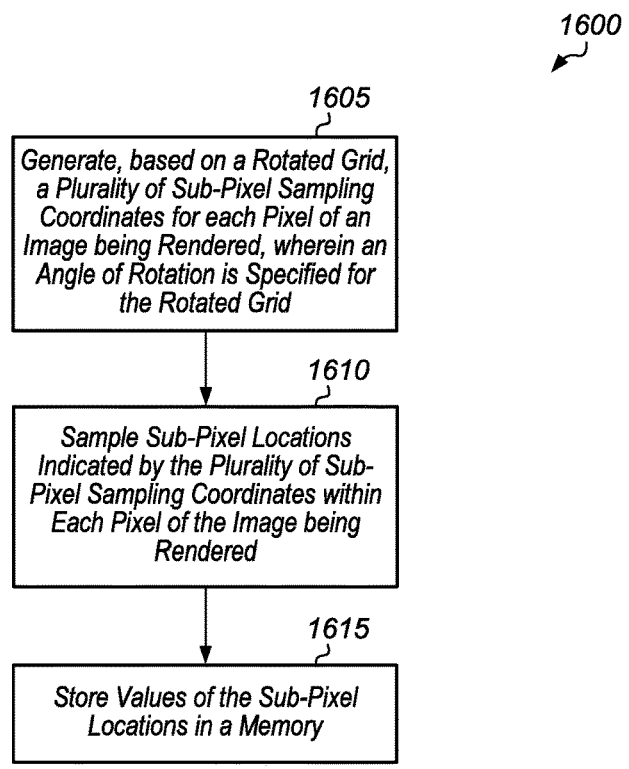
FIG. 16 is a generalized flow diagram illustrating one embodiment of a method for sampling sub-pixel locations of an image.

Turning now to FIG. 16, one embodiment of a method 1600 for sampling sub-pixel locations of an image is shown. A processor generates, based on a rotated grid, a plurality of sub-pixel sampling coordinates for each pixel of an image being rendered, wherein an angle of rotation is specified for the rotated grid (block 1605). The angle of rotation can also be referred to more generally as an amount of rotation. Next, the processor samples sub-pixel locations indicated by the plurality of sub-pixel sampling coordinates within each pixel of the image being rendered (block 1610). Then, the processor stores values of the sub-pixel locations in a memory (block 1615). It is noted that the memory represents a cache, local data share, global data share, memory device, or any other suitable collection of storage elements. After block 1615, method 1600 ends.

Figure 17:
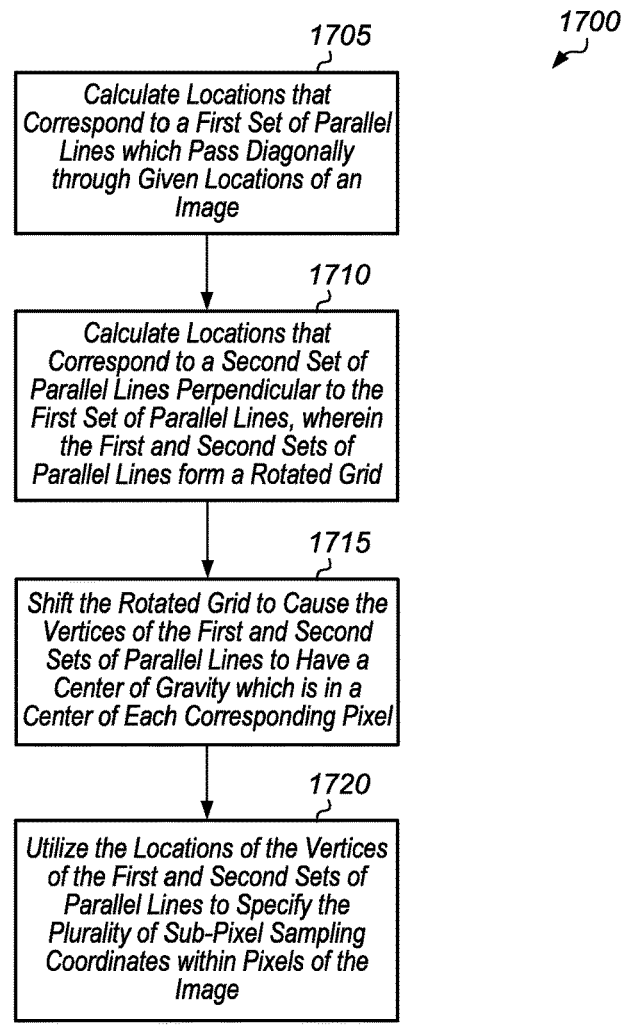
FIG. 17 is a generalized flow diagram illustrating one embodiment of a method for generating a plurality of sub-pixel sampling coordinates for each pixel of an image being rendered.

Referring now to FIG. 17, one embodiment of a method 1700 for generating a plurality of sub-pixel sampling coordinates for each pixel of an image being rendered is shown. A processor calculates locations that correspond to a first set of parallel lines which pass diagonally through given locations of an image (block 1705). It is noted that to "pass diagonally" is defined as traversing the image at an angle other than 90 or 180 degrees. In other words, the first set of parallel lines are not parallel with either the horizontal or vertical lines of a square grid marking the boundaries of the pixels of the image. In one embodiment, the given locations are corners of the pixels. In another embodiment, the given locations are centers of the pixels. In various embodiments, the slope of each line of the first set of parallel lines is generated from a ratio of two mutually prime numbers. For example, in one embodiment, the slope of each line of the first set of parallel lines is two pixels by one pixel. In other embodiments, the slope can be other suitable ratios. In one embodiment, the distance between adjacent lines is constant for each pair of adjacent lines of the first set of parallel lines.

Next, the processor calculates locations that correspond to a second set of parallel lines perpendicular to the first set of parallel lines, and wherein the first and second sets of parallel lines form a rotated grid (block 1710). In one embodiment, the distance between adjacent lines is constant for each pair of adjacent lines of the second set of parallel lines. In one embodiment, the distance between adjacent lines of the first set of parallel lines is equal to the distance between adjacent lines of the second set of parallel lines. Then, the processor shifts the rotated grid to cause the vertices of the first and second sets of parallel lines to have a center of gravity which is in a center of each corresponding pixel (block 1715). Next, the processor utilizes the locations of the vertices of the first and second sets of parallel lines to specify the plurality of sub-pixel sampling coordinates within pixels of the image (block 1720). After block 1720, method 1700 ends. Implementing method 1700 will cause the sub-pixel sampling coordinates to be regularly spaced both horizontally and vertically. Additionally, implementing method 1700 will result in there being only one sub-pixel sampling location per pixel on a given horizontal or vertical line which traverses the image. It is noted that in other embodiments, other methods can be implemented to achieve similar sub-pixel sampling patterns as those generated by method 1700. In general, for a square grid that has a density of "$a^2+b^2$" sub-samples per pixel (wherein a and b are integers), if the grid is rotated or mirrored at an angle of "a $\tan(a/b)+90*n$" (wherein n is an integer), then the sampling pattern within each pixel will be identical.

Figure 18:
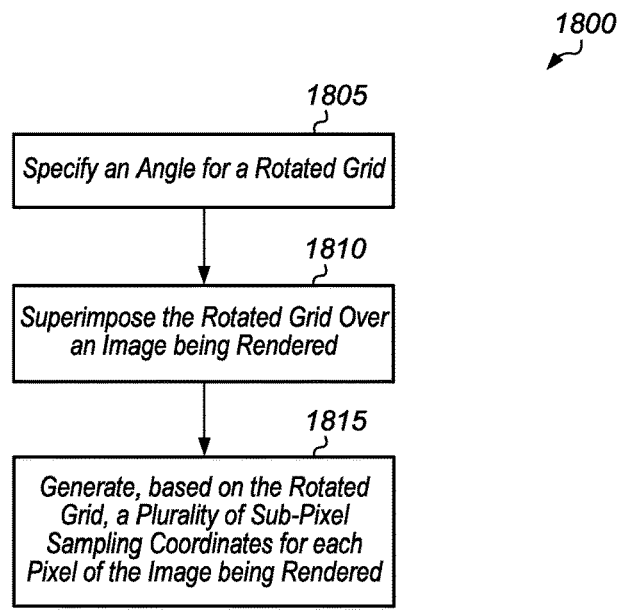
FIG. 18 is a generalized flow diagram illustrating one embodiment of a method for generating sub-pixel sampling coordinates.

Turning now to FIG. 18, one embodiment of a method for generating sub-pixel sampling coordinates is shown. A processor specifies an angle for a rotated grid (block 1805). For example, the processor could specify that a first set of lines of the rotated grid have a slope of 2×1, which refers lines which are parallel to a diagonal of a rectangle two pixels wide and one pixel high. A second set of lines of the rotated grid are perpendicular to the first set of lines. Next, the processor superimposes the rotated grid over an image being rendered (block 1810). Then, the processor generates, based on the rotated grid, a plurality of sub-pixel sampling coordinates for each pixel of the image being rendered (block 1815). After block 1815, method 1800 ends.

Figure 19:
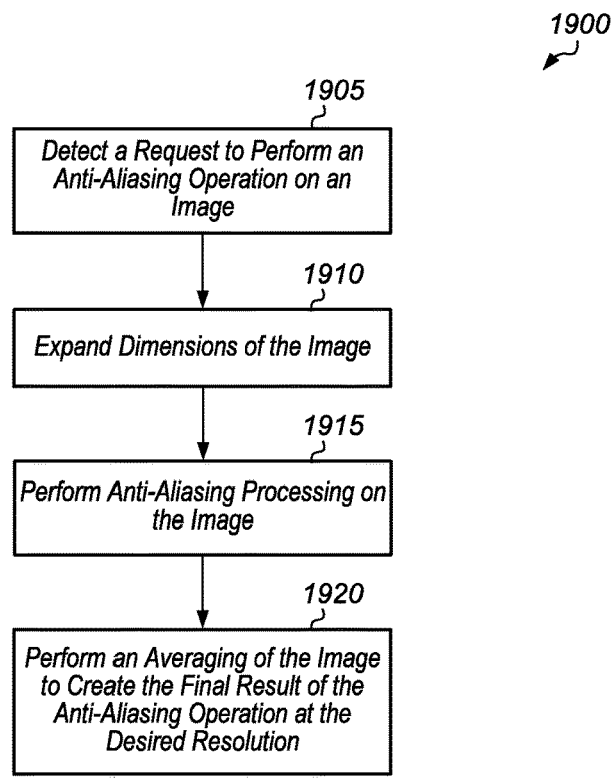
FIG. 19 is a generalized flow diagram illustrating one embodiment of a method for performing an anti-aliasing operation.

Referring now to FIG. 19, one embodiment of a method for performing an anti-aliasing operation is shown. A processor detects a request to perform an anti-aliasing operation on an image (block 1905). It is noted that the anti-aliasing operation can also be referred to as an anti-aliasing resolve operation. In response to detecting the request, the processor expands dimensions of the image (block 1910). In one embodiment, the processor performs a virtual expansion of the image in block 1910. The virtual expansion can be performed by creating a new image that is larger or by treating the original image as a larger image. In one embodiment, the processor treats the original image as a larger image that is rotated. In one embodiment, expanding dimensions of the image is defined as converting the sub-pixels into regular pixels. In some embodiments, the image is also rotated to cause the regular pixels to be aligned in a rectangular grid. Next, the processor performs anti-aliasing processing on the image (block 1915). Then, the processor performs an averaging of the image to create the final result of the anti-aliasing operation at the desired resolution (block 1920). After block 1920, method 1900 ends.

Figure 20:
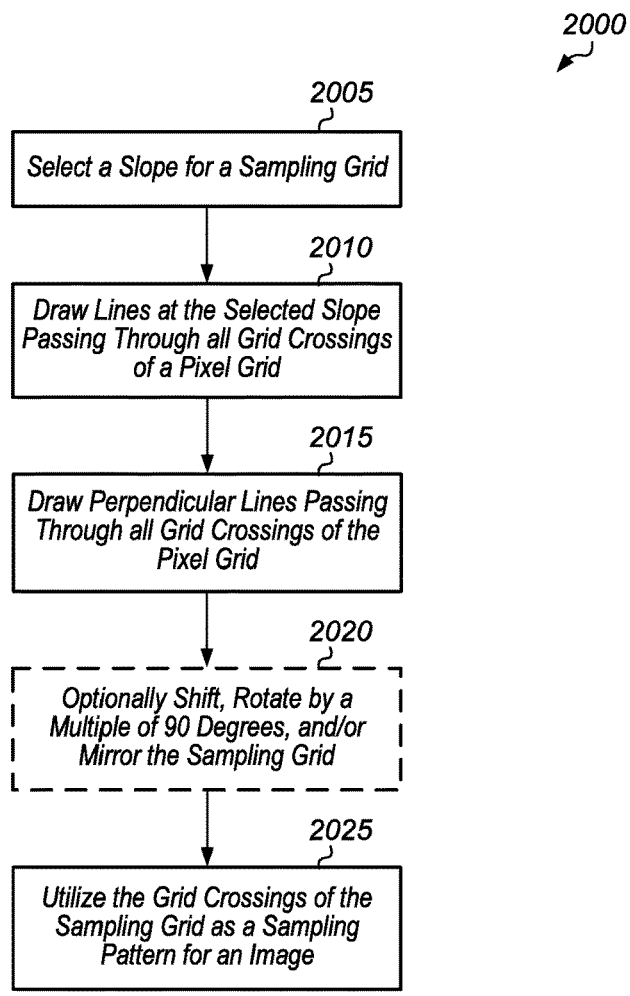
FIG. 20 is a generalized flow diagram illustrating one embodiment of a method for generating a sampling grid.

Turning now to FIG. 20, one embodiment of a method for generating a sampling grid is shown. A slope (e.g., 2×1) is selected for a sampling grid (block 2005). Next, lines at the selected slope are drawn passing through all grid crossings of a pixel grid (block 2010). In another embodiment, the lines at the selected slope are drawn passing through all pixel centers of the pixel grid in block 2010. Then, perpendicular lines are drawn passing through all grid crossings of the pixel grid (block 2015). Alternatively, in another embodiment, the perpendicular lines are drawn passing through all pixel centers of the pixel grid in block 2015. The lines drawn in blocks 2010 and 2015 will generate a rotated regular grid. This rotated regular grid can also be referred to as the sampling grid.

Next, in an optional step, the sampling grid is shifted, rotated by a multiple of 90 degrees, and/or mirrored (block 2020). The pattern created by the grid crossings of the sampling grid within a single pixel is utilized as a sampling pattern for an image (block 2025). The sampling pattern within a single pixel will be identical for all pixels in the image for the sampling pattern created by method 2000. After block 2025, method 2000 ends. It is noted that any of the systems and/or apparatuses described herein can be configured to perform method 2000.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
a memory; and
a plurality of execution units;
wherein the processor is configured to:
generate, based on a rotated grid, a plurality of sub-pixel sampling coordinates for each pixel of an image being rendered, wherein an amount of rotation is specified for the rotated grid and a slope of the rotated grid is selected to be equal to a ratio of two mutually prime numbers;
sample sub-pixel locations indicated by the plurality of sub-pixel sampling coordinates within each pixel of the image being rendered by the plurality of execution units; and
store values of the sub-pixel locations in the memory.

2. The processor as recited in claim 1, wherein generating, based on the rotated grid, the plurality of sub-pixel sampling coordinates comprises:
calculating locations that correspond to a first set of parallel lines which pass diagonally through given locations of the image;
calculating locations that correspond to a second set of parallel lines perpendicular to the first set of parallel lines, wherein the first and second sets of parallel lines form the rotated grid;
shifting the rotated grid to cause vertices of the first and second sets of parallel lines to have a center of gravity which is in a center of each corresponding pixel; and
specifying the plurality of sub-pixel sampling coordinates to coincide with locations of the vertices of the first and second sets of parallel lines within pixels of the image.

3. The processor as recited in claim 2, wherein the given locations are corners of the pixels.

4. The processor as recited in claim 2, wherein the given locations are centers of the pixels.

5. The processor as recited in claim 1, wherein the sub-pixel sampling coordinates are regularly spaced both horizontally and vertically.

6. The processor as recited in claim 1, wherein there is only one sub-pixel sampling location per pixel on a given horizontal or vertical line which traverses the image.

7. The processor as recited in claim 1, wherein a number of sampling points for each pixel is greater than two.

8. A method for use in a computing device, the method comprising:
generating, based on a rotated grid, a plurality of sub-pixel sampling coordinates for each pixel of an image being rendered, wherein an amount of rotation is specified for the rotated grid and a slope of the rotated grid is selected to be equal to a ratio of two mutually prime numbers;
sampling sub-pixel locations indicated by the plurality of sub-pixel sampling coordinates within each pixel of the image being rendered; and
storing values of the sub-pixel locations in the memory.

9. The method as recited in claim 8, wherein generating, based on the rotated grid, the plurality of sub-pixel sampling coordinates comprises:
calculating locations that correspond to a first set of parallel lines which pass diagonally through given locations of the image;

calculating locations that correspond to a second set of parallel lines perpendicular to the first set of parallel lines, wherein the first and second sets of parallel lines form the rotated grid;

shifting the rotated grid to cause vertices of the first and second sets of parallel lines to have a center of gravity which is in a center of each corresponding pixel; and specifying the plurality of sub-pixel sampling coordinates to coincide with locations of the vertices of the first and second sets of parallel lines within pixels of the image.

10. The method as recited in claim 9, wherein the given locations are corners of the pixels.

11. The method as recited in claim 9, wherein the given locations are centers of the pixels.

12. The method as recited in claim 8, wherein the sub-pixel sampling coordinates are regularly spaced both horizontally and vertically.

13. The method as recited in claim 8, wherein there is only one sub-pixel sampling location per pixel on a given horizontal or vertical line which traverses the image.

14. The method as recited in claim 8, wherein a number of sampling points for each pixel is greater than two.

15. A system comprising:
a memory; and
a processor;
wherein the processor is configured to:
    generate, based on a rotated grid, a plurality of sub-pixel sampling coordinates for each pixel of an image being rendered, wherein an amount of rotation is specified for the rotated grid and a slope of the rotated grid is selected to be equal to a ratio of two mutually prime numbers;
    sample sub-pixel locations indicated by the plurality of sub-pixel sampling coordinates within each pixel of the image being rendered; and
    store values of the sub-pixel locations in the memory.

16. The system as recited in claim 15, wherein generating, based on the rotated grid, the plurality of sub-pixel sampling coordinates comprises:

calculating locations that correspond to a first set of parallel lines which pass diagonally through given locations of the image;

calculating locations that correspond to a second set of parallel lines perpendicular to the first set of parallel lines, wherein the first and second sets of parallel lines form the rotated grid;

shifting the rotated grid to cause vertices of the first and second sets of parallel lines to have a center of gravity which is in a center of each corresponding pixel; and specifying the plurality of sub-pixel sampling coordinates to coincide with locations of the vertices of the first and second sets of parallel lines within pixels of the image.

17. The system as recited in claim 16, wherein the given locations are corners of the pixels.

18. The system as recited in claim 16, wherein the given locations are centers of the pixels.

19. The system as recited in claim 15, wherein the sub-pixel sampling coordinates are regularly spaced both horizontally and vertically.

20. The system as recited in claim 15, wherein a number of sampling points for each pixel is greater than two.

* * * * *